Oct. 6, 1970 J. L. BARCUS 3,532,345

RANDOM SOUND REPRODUCTION MEANS IN A TOY

Filed Oct. 23, 1968 4 Sheets-Sheet 1

INVENTOR
JACK L. BARCUS

BY Seymour Scholnick
ATTORNEY

Oct. 6, 1970 J. L. BARCUS 3,532,345

RANDOM SOUND REPRODUCTION MEANS IN A TOY

Filed Oct. 23, 1968 4 Sneets-Sheet 2

INVENTOR
JACK L. BARCUS

BY Seymour Scholnick
ATTORNEY

Oct. 6, 1970 J. L. BARCUS 3,532,345

RANDOM SOUND REPRODUCTION MEANS IN A TOY

Filed Oct. 23, 1968 4 Sheets-Sheet 3

INVENTOR
JACK L. BARCUS

BY Seymour Schulnick
ATTORNEY

INVENTOR
JACK L. BARCUS
BY Seymour Scholnick
ATTORNEY 3,532,345

RANDOM SOUND REPRODUCTION MEANS IN A TOY

Jack L. Barcus, Palos Verdes Peninsula, Calif., assignor to Mattel, Inc., Hawthorne, Calif., a corporation of Delaware Filed Oct. 23, 1968, Ser. No. 769,888
Int. Cl. G11b *19/16*
U.S. Cl. 274—1 2 Claims

ABSTRACT OF THE DISCLOSURE

A toy with a sound reproducing mechanism with which a plurality of recorded sayings are reproduced at a random rather than in a fixed sequence is disclosed. The mechanism includes a cam which is loosely carried by the toy's drawstring which controls the random positioning of a tone arm and the stylus thereof with respect to a plurality of discrete grooves in which the various sayings are recorded.

BACKGROUND OF THE INVENTION

Field of the invention

The present invention relates to a sound reproducing apparatus, and, more particularly, to a sound reproducing device of the type incorporable in a toy, capable of reproducing a plurality of sounds or series of sounds, hereafter referred to as sayings, in a random sequence.

Description of the prior art

The use of sound reproducing devices in toys, in order to produce talking toys, is well known. Typically, such a sound reproducing device, which is concealably mounted in a toy, includes a disc-like record in which a plurality of sayings are recorded in separate, independent sound grooves. Means, generally in the form of a rewindable spiral spring is used to cause the record to rotate while a stylus, supported in a tone arm, engages one of the grooves. The stylus produces mechanical signals, which are used in an associated diaphragm to produce the desired audio signals which together create the saying, recorded in the particular groove. The toy is provided with means, such as a drawstring or cord, which may be used by a playing child, to cock or activate the sound reproducing device to reproduce one of the sayings.

Herebefore, each of the known sound reproducing devices included means which control the reproduction of the sayings to occur in a fixed sequence. Such means, hereafter referred to as the tone arm positioning control means, which are activated when the sound reproducing device is cocked, control the positioning of the tone arm which supports the stylus, so that after any one of the sayings, out of the plurality of sayings recorded on the record is produced, the stylus engages a specific groove in which is recorded a saying which follows, in the fixed sequence, the previously reproduced saying. Such tone arm positioning control means are described in several U.S. Pats., including Pat. Nos. 3,168,318 and 3,282,590 in which these means, designed to control the reproduction of sayings to occur in a predetermined sequence, form the primary inventive features. As seen from these patents, the tone arm positioning control means significantly increase the complexity of the sound reproducing devices, thereby increasing the likelihood of malfunctioning, as well as the increased initial production cost, which, in the competitive toy industry, is of primary concern.

A further and more significant disadvantage of a toy in which sayings are reproduced in a fixed sequence is the limited enjoyment which may be derived from such a toy. A child, after a brief playing period tends to memorize the fixed sequence of sayings, so that after hearing any of the sayings the child knows already the next saying, in the fixed sequence, which may be reproduced. Thus, the element of surprise or the unexpected, which greatly enhances playing enjoyment, does not exist when playing with toys incorporating the prior art type sound reproducing devices.

OBJECTS AND SUMMARY OF THE INVENTION

It is a primary object of the present invention to provide a novel, improved sound reproducing device.

Another object is to provide a new sound reproducing device, of the type incorporated in a toy, to enhance the enjoyment, derivable from playing with the toy.

A further object is to provide a new sound reproducing device, for use in a toy, which is less complex than similar prior art sound reproducing devices.

Still a further object is to provide a new, relatively simple device, capable of successively reproducing any one of a plurality of recorded sayings in a random sequence.

Yet a further object is to provide a new, simple and relatively inexpensive sound reproducing device for use in a toy, designed to reproduce a plurality of recorded sayings in a random, rather than a fixed sequence.

These and other objects of the invention are achieved by providing a sound reproducing device, of the type mountable in a toy, which includes a stylus-carrying tone arm and means which control the random positioning of the arm relative to a record, in which sayings are recorded in sound grooves. In one specific embodiment, which will be described hereafter in detail, the means include a cam, loosely supported on a device-cocking drawstring. When the string is pulled by a child to activate the sound reproducing device, to reproduce a saying, the cam is randomly secured between a stop member of the device and the tone arm, thereby randomly controlling the arm's radial position on the record. Consequently, the sound groove, which the stylus engages to reproduce the next saying, is randomly chosen.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
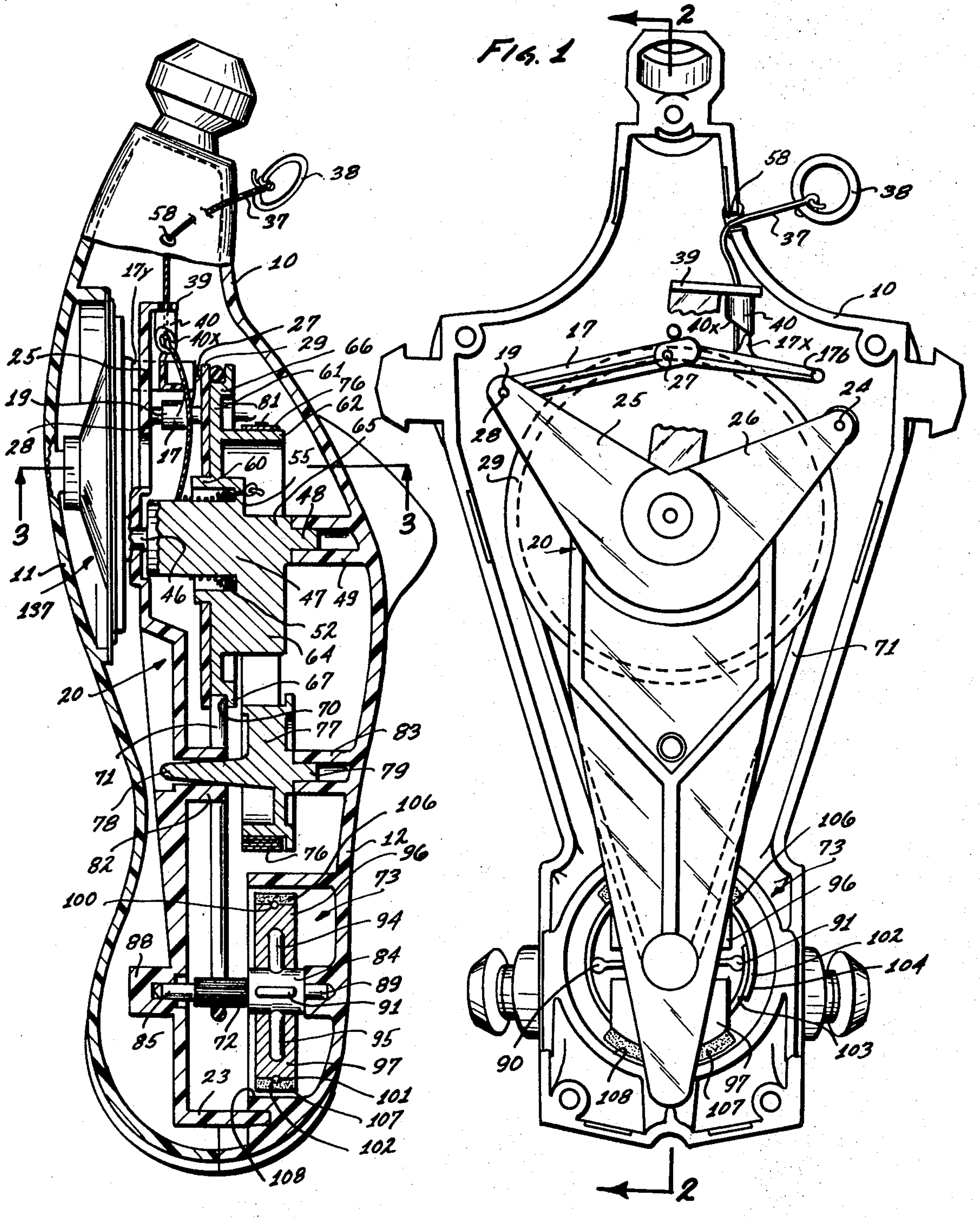
FIG. 1 is a plan view of the toy of the present invention, with a removed top cover.
FIG. 2 is a cross-sectional view along lines 2—2 in FIG. 1.

As seen from FIGS. 1 and 2, one embodiment of the sound reproducing device of the present invention, which is mounted in a casing 10 of a toy, includes a tone arm 17 which is pivotally secured at 19 on pin 28, extending upwardly from a lower casing or housing member 11. The pin 28 terminates in a member 25 of an inner, generally longitudinally extending frame member, designated as 20, which is supported in the lower casing portion 11 by pins 23, 24 and 28. The member 20 has a bifurcated end, formed of members 25 and 26.

Figures 3, 4:
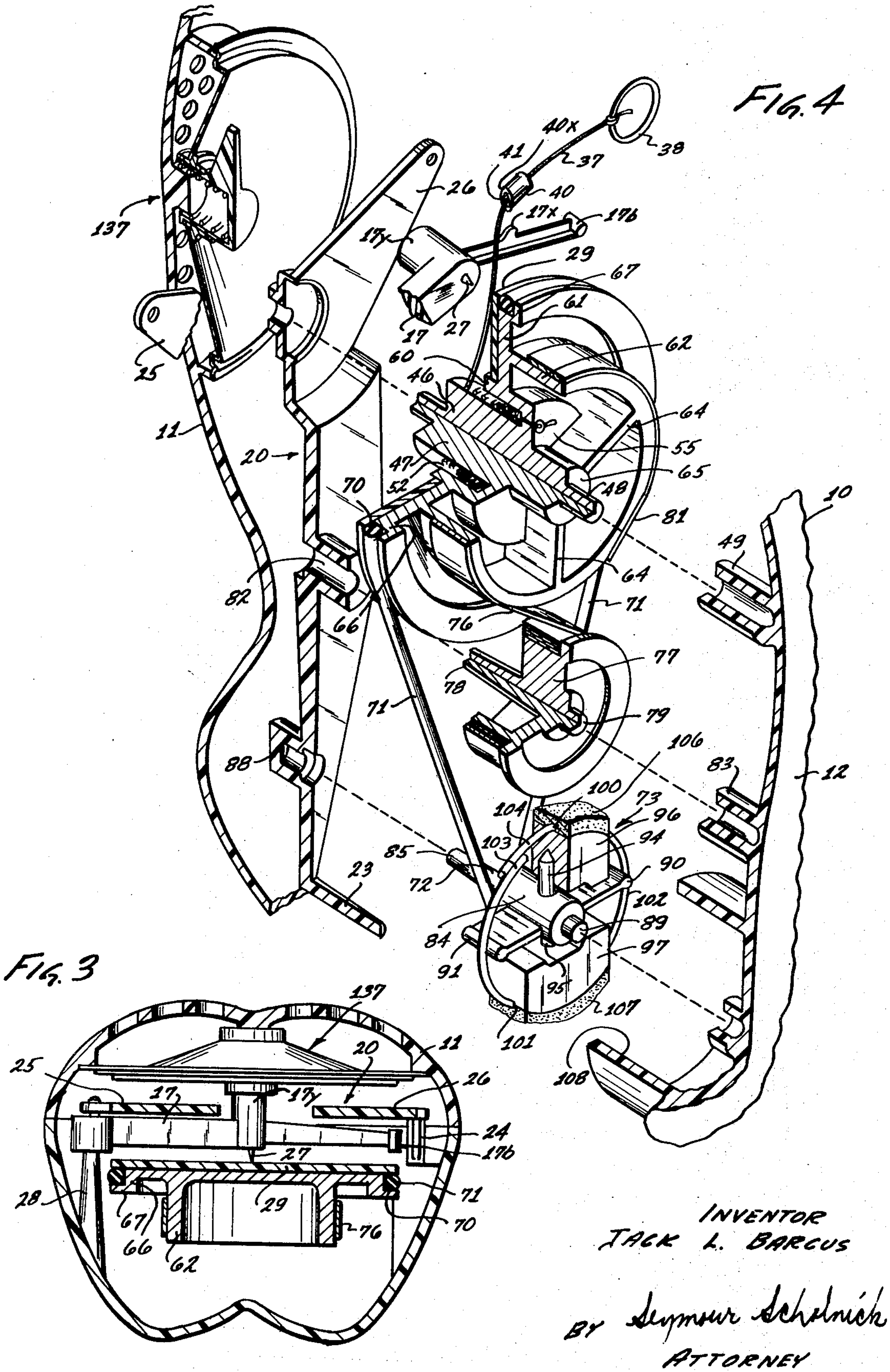
FIG. 3 is a cross-sectional view along lines 3—3 in FIG. 2.
FIG. 4 is an exploded view with portions cut away, the view being taken substantially along lines 2—2 in FIG. 1.
Figure 5:
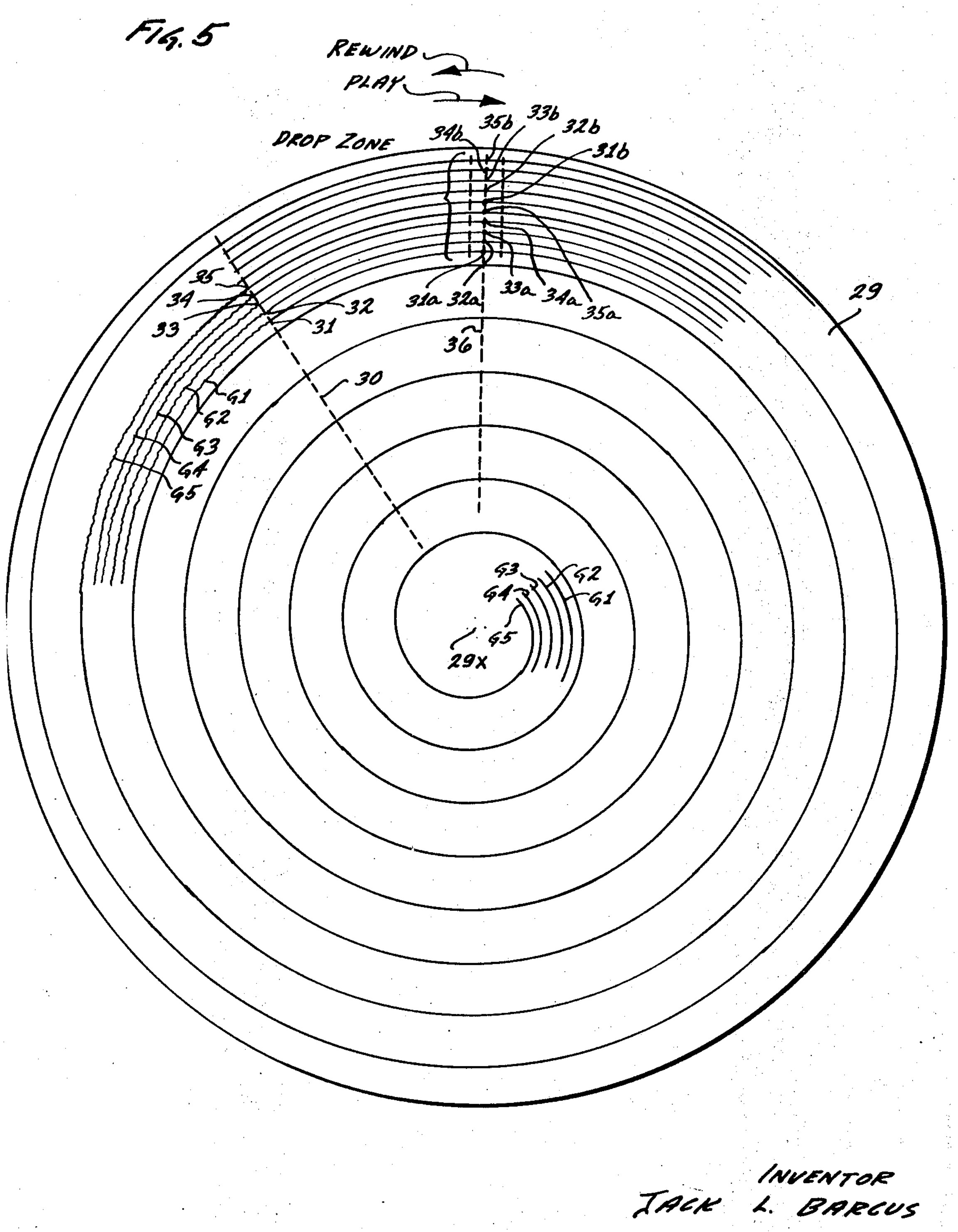
FIG. 5 is a plan view of a record, in accordance with the present invention.

The tone arm 17 supports a stylus or sound pickup needle 27 which is shown in FIGS. 2, 3 and 4. Its function is to engage a side or surface of a recorded message carrier means of sound recording disc or record 29. Record 29 is similar in principle to a conventional record in which sounds are recorded on the record surface in the form of a continuous modulated groove, which is used to engage a stylus whose position is modulated as the record rotates. The stylus output is then used to reproduce the sounds recorded on the record. The record 29, incorporated in the present invention, differs from a conventional record in the manner in which the grooves are formed therein. A top view of one example of record 29 is shown in FIG. 5 to which reference is made herein. Cross-sectional views of the record are shown in FIGS. 3 and 4, FIG. 3 being a cross-sectional view along lines 3—3 in FIG. 2, while FIG. 4 is an exploded view of the assembly of mechanical elements of the sound reproducing device of the present invention.

Briefly, as seen from FIG. 5, a top side or surface of record 29 defines a plurality of discrete, separate multi-convolution grooves. The number of grooves, designated G1–G5 is limited to five in FIG. 5, for explanatory purposes only. Only groove G5 is shown in its entirety. Each groove is sound modulated, as represented by the wavy lines, thereby storing a specific sequence of sounds, hereafter referred to as sayings, which are reproducible by engaging stylus 27. The stylus is position modulated as the record rotates, typically in the direction of an arrow labeled PLAY, so that the stylus follows in the groove radially inwardly toward center 29*x* of record 29. The convolution of each groove closest to the center may be defined as the inner convolution, while the convolution of each groove containing the start of a saying may be thought of as the outer convolution. In FIG. 5, the start points of all the sayings in the five grooves, G1–G5 are assumed to be aligned along a radial line 30, and are designated by numerals 31 through 35.

As is appreciated by those familiar with art art, since the grooves G1–G5 are discrete grooves, rather than one continuous groove as is the case in a conventional record, after one of the sayings is reproduced, in order to reproduce another saying it is necessary to engage the stylus with the outer convolution of a second groove at its saying start point. In the prior art, special attention being directed to the previously mentioned patents, complex means are provided to control the engagement of the stylus in a manner whereby sayings are reproduced in a predetermined sequence. As previously indicated, such a feature is undesirable due to the added complexity of the sound reproducing device and, more particularly, due to the limited playing enjoyment which may be derived from a toy in which sayings are reproduced in a fixed, rather than a random, sequence.

Such limitations are overcome with the present invention which provides simple means whereby the sayings are reproducible in a random sequence. Briefly, these novel means control the engagement position of the stylus with the grooves so that, after one of the sayings is reproduced, the stylus may engage any one of the grooves to reproduce any one of the sayings, including repeated reproduction of the previously reproduced saying. To provide such a capability, each multi-convolution groove includes a lead convolution portion which precedes its saying start point and extends through a selected part of the disc surface. This surface part is labled in FIG. 5 by the DROP ZONE. Points 31*a*, 32*a*, 33*a*, 34*a* and 35*a* which are aligned in a radial line 36 designate engagement points for grooves G1–G5 respectively within the Drop Zone.

The novel sound reproducing device of the present invention includes an arrangement of elements which randomly position the stylus above the Drop Zone so that when the stylus finally drops onto the Drop Zone surface it may engage any one of the grooves at any one of points 31*a*–35*a*. The arrangement of these elements, which together may be thought of as comprising random position control means, will now be explained in conjunction with the figures and in particular FIG. 1. Therein, the sound reproduction device is shown including a multipurpose drawstring or cord 37 which is manually pullable by means of a ring 38. One of the primary functions of cord 37 when it is pulled is to cause the assembly, on which the disc is supported, to rotate in a rewind direction opposite the direction of the disc rotation during PLAY or sound reproduction. The rewind direction is indicated in FIG. 5 by an arow labled, REWIND. At the same time an energizable element such as a spring is wound up so that when the cord is released the spring causes the disc to again rotate in the play direction.

The cord 37, which extends through a rigid stop member 39 (FIGS. 1, 2 and 6) which is fixedly secured in the sound reproduction device, loosely suports a camlike member or cam 40. As seen in FIG. 1 and in particular in the expanded partial views of FIGS. 6 and 7, the cam defines a longitudinal aperture 41 of a diameter which is greater than the thickness or diameter of the cord 37. Cam 40 is strung on the cord 37 between the tone arm 17 and the stop member 39, so that as the arm is pulled by the cord 37 and caused to pivot counterclockwise, the arm pushes the loosely supported cam 40 against the stop member 39. When the cord 37 is fully drawn or pulled, the cam is frictionaly engaged to, and supported by, member 39 and a protuberance or pointer 17*x* of arm 17. The cam 40 includes a cam surface or side 40*x*, against which pointer 17*x* is biased. Since the cam 40 is loosely supported on cord 37, pointer 17*x* engages the cam side 40*x* at a random point. Consequently, the arm 17 is stopped at a random rather than a fixed pivotal position, which results in the random positioning of the stylus above the record's Drop Zone. In the figures, the cam side 40*x* is shown continuously sloping from one end to the other. It should be appreciated however, that if desired, cam side 40*x* may be shaped to form a plurality of steps extending from one end to the other. Thus, the sloped cam side should be regarded as one example of a cam surface.

Figure 7:
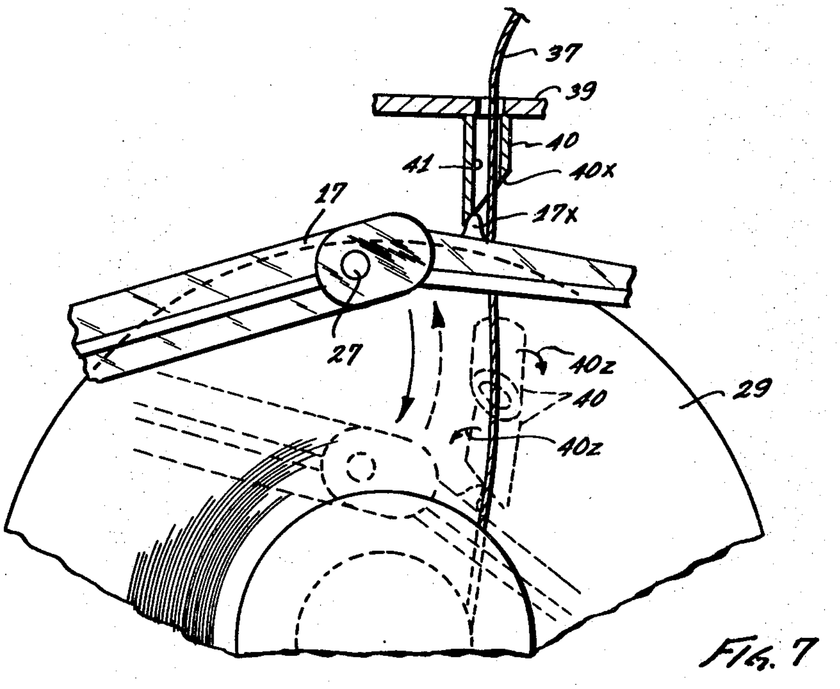
FIGS. 6 and 7 are partial plan views of elements of the present invention, useful in explaining the novel teachings thereof.
Figure 6:
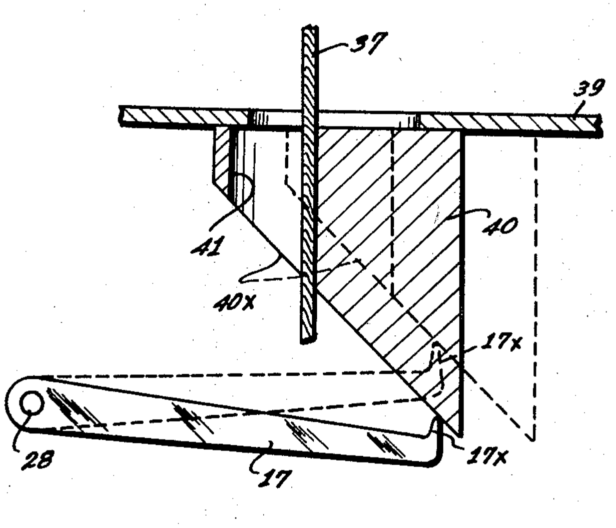

This significant aspect of the invention is more clearly apparent from the arrangement diagrammed in FIG. 6, wherein the dimensions of the various elements are purposely exaggerated. Therein, solid lines represent one position of the cam 40 and the pivotal position of arm 17 about pin 28, in which the cord is shown abutting the right hand side of aperture 41, while the dashed lines represent the cam and the arm positions when the cam is engaged between the stop member 39 and the arm 17, with the cord abutting the left side of aperture 41. Clearly, the arm may assume any pivotal position between the two diagrammed ones, whenever the cam 40 is clamped between the arm 17 and the stop member 39 and the cord 37 is between the two opposite sides of aperture 41, thereby assuming a random pivotal position. The randomness with which the cam is positionable is further enhanced by the ability of the cam to rotate about the cord 37 as indicated in FIG. 7 by arrow 40*z*. Thus, the two positions in FIG. 6 in which the cam is diagrammed transversely of cord 37 should be regarded only as examples since the cam does not move only transversely of cord 37, but is free to also rotate thereabout.

It should be clear that by randomly stopping or inhibiting the pivotal position of arm 17, the stylus 27 is stopped at a random radial position above disc 29. The various elements are shaped and aligned, so that when the arm 17 is finally stopped, when its pointer 17*x* is biased by cord 37 against cam 40, the stylus is randomly stopped above line 36 in the Drop Zone. Consequently, when the cord is released, thereby initiating the playing or reproduction of a saying, the stylus drops onto the disc in the Drop Zone, randomly engaging any one of the grooves, at any one of points 31*a*–35*a*. Thus, the saying which is reproduced is randomly chosen.

The cam size, the slope (or other shape) of side 40*x*, the diameter of aperture 41 with respect to the cord thickness, are chosen to produce a sufficiently large range of change of the arm's pivotal position in order to produce a sufficient range of change in the radial position of the stylus along line 36 in the Drop Zone, so that any one of points 31*a*–35*a* may be engaged thereby. If desired, each groove in disc 29 may include several points on separate lead convolutions, located within the Drop Zone. In such an arrangement there would be several points at which the stylus may engage the same groove. As shown in FIG. 5, each groove includes at least one complete convolution which starts ahead of radial line 36 so that each groove such as G1 defines two points (31*a* and 31*b*) in the Drop Zone. Consequently, the saying, recorded in groove G1, may be reproduced when the stylus, when dropped onto the disc, engages the groove at either point 31*a* or point 31*b*. Likewise, grooves G2–G5 are engagable at points 32*a* and 32*b*, 33*a* and 33*b*, 34*a* and 34*b*, 35*a* and 35*b*, respectively.

From the foregoing it should thus be appreciated that the objects of the present invention are achieved by providing means which control the random positioning of a stylus above a record on which a plurality (such as five) sayings are recorded, in separate discrete grooves (such as G1–G5). Consequently, when the device is enabled to reproduce a saying, such as by releasing the pulled or stretched cord 37, the stylus which is randomly positioned above a selected surface portion of the disc, such as the Drop Zone, is lowered or dropped thereon to randomly engage one of the grooves. As a result, the sayings are reproducible in a random, rather than a fixed sequence.

In the particular embodiment herebefore described, the random positioning of the stylus is provided by a cam, loosely supported on the device's actuating cord. As the cord is pulled to activate or energize the device to reproduce a saying, the cord pulls the tone arm to engagement with the cam which is finally stopped against a stop member. The point of engagement of the arm, biased against a sloping side of the stopped cam, controls the relative pivotal position of the arm, and correspondingly the stylus's radial position above the Drop Zone.

It should be pointed out that the noval means of the present invention may be incorporated in any device, designed to reproduce any one of a plurality of sayings or sound sequences, which are recorded on separate tracks or grooves. However, in order to describe a complete embodiment of a sound reproducing device in which the teachings of the invention may be incorporated, a particular embodiment, actually reduced to practice, in which the random positioning control means have been incorporated will be detailed.

Referring again to FIGS. 1–4, there is shown an upper end 17*y* of the needle portion of the tone arm which supports a sound frequency transmitting unit, generally designated as 137, similar to the type disclosed in U.S. Pat. No. 3,174,756. Since unit 137 is not deemed to be new it will not be described in further detail.

A phonograph rotor spindle 46 is bearing mounted for rotation in the frame member 20 and at lower end of the rotor 47 is a spindle 48 bearing mounted for rotation in a boss 49 extending upwardly from the lower casing member. Immediately outwardly of the central portion of the rotor is an annular well or groove 52 for carrying the winding drawstring or cord 37 when the rotor and record 29 are in an unwound or de-energized condition. The well saves space in the compact arrangement and prevents the cord from interfering with rotor and surrounding parts so to not increase frictional drag. An end (see FIG. 4) of the cord is inserted through an opening at the bottom of the groove 52 and is knotted at the underside 55 of the rotor to secure the cord to the rotor. The other end of the cord 37 extends through an opening 58 in the upper casing half and has the pull ring 38 secured thereto.

Radially outwardly of the groove 52 is an annular wall 60 having an external cylindrical surface on which the record 29 is fitted. Also extending radially of the groove 52 is a record support disc 61, having an annualr skirt 62 extending downwardly therefrom. The record is secured to the disc by glue or cement. The skirt is supported by three annularly spaced webs 64 which extend outwardly from a small diameter portion 65 of the rotor. At the outer portion of the disc 61 is an axially extending annular member 66 and from it extends a radial flange 67, which with a circumferential portion of the record forms an annual groove 70. Fitted to be driven by the rotor in the groove 70 is an elastomeric ring or belt 71 which extends around the knurled spindle 72 so as to drive a governor, generally designated as 73.

A flat constant-force spring 76 has an end secured at 81 to the outer surface of the skirt 62 about which it is wound by pulling the ring 38 on the string 37. The other end, not shown, of the spring 76 is securingly maintained on the drum 77 on which the spring is normally stored in its unwound or at rest position relative to the record rotor. The drum 77 has its spindles 78 and 79 bearing mounted for rotation in bosses 82 and 83, respectively, in the casing. As may be seen in FIG. 4, the spring extends from the storage drum 77 to the skirt 62 but is wound in the opposite direction on the skirt from which it is wound on the drum 77. On the drum, the spring is in its at rest position, whereas when it is wound on the skirt 62 by pulling the string 37 out of the groove 52, it is in a stored energy condition, and when the ring 38 is thereafter released, the spring rewinds on its drum 77, unwinding from the skirt, to rotate the record, winding the string on the rotor in the groove 52, the rotation of the rotor and record, during the play, being in the clockwise direction while the winding of the spring on the drum is in the counterclockwise direction. It has been found to be advantageous in the compact mechanism of the invention to position the flange 67 extending from the rotor 47 so that it acts as a guide for the spring during the winding and unwinding.

The governor 73 is formed of a rotor 84 from which the knurled spindle 72 extends. A further extension from the spindle is a second spindle 85 bearing mounted for rotation in a boss 88 in the frame member 20. From the opposite end of the rotor extends a spindle 89, bearing mounted for rotation in the lower casing 12. Extending diametrically from opposite sides of the rotor are a pair of spring contacting members 90 and 91 and extending at 90° to the latter members are a pair of cylindrical diametrical pins 94 and 95. The pins 94 and 95 are slidably engaged in bores on the governor weights 96 and 97 and when they are in their innermost position fit on the rotor and on the radially directed surfaces of the string contacting members 90 and 91.

In the outer circumferential surfaces of the weights are annular grooves 100 and 101 in which a single wire spring 102 is fitted. The spring has free ends 103 and 104 overlapping and from which position they can be moved depending upon the radical position of the weights. On the outer circumferential surfaces of the weights are secured frictional members 106 and 107 which are adapted to engage the inner cylindrical surface of a wall 108 of the cylinder in which the rotor is centrally positioned, frictional braking contacts being made at excessive speeds of the governor. The governor is driven by the belt 71 which is in turn driven by the rotation of the record rotor during sound reproduction. As the speed of the governor increases, the weights move outwardly under the influence of centrifugal force and against the force of the spring 102. The frictional members 106 and 107 may engage the interior cylindrical surface of the wall 108 so that this frictional engagement retards or restrains rotation of the governor and thus limits the speed of rotation. In this manner, the speed of rotation of the record is controlled and regulated and maintained at the optimum speed for desirable reproduction of sound. During rotation of the governor the circular configuration of the spring is maintained in part by the outer circumferential surfaces of the spring contacting members 90 and 91. These provide a very light weight means to maintain the proper spring configuration. It has been found to be advantageous to cast the rotor, the members 90 and 91, the weight supporting members 94, 95 and the governor spindles in one piece of plastic. It should be noted that the spring is slidable within the grooves formed in the outer surfaces of the weights and the mating grooves formed in the inner surfaces of the frictional members. The ends 103 and 104 of the spring prevent substantial rotation of the spring by contact with the weights or members 90 and 91 so that they do not enter the grooves 100 and 101.

In operation, the needle 27 and the tone arm are shown in FIG. 1 to be in position to start the play of the record. However, the spring is not shown as being wound on the skirt 62 as required to play the record. Normally, when the spring 76 is in its at rest position on the drums 77, the needle 27 would be radially inwardly on the record at "an end of play" position adjacent the wall 60 on the rotor. To then energize the rotor 47 for playing, the string is pulled to unwind it from the rotor 47, and at the same time to unwind the spring 76 from the drum 77 and onto the skirt 62. When this occurs, the driving energy for the rotation of the record is stored in the spring and the device is energized to reproduce the sound in any track or groove randomly selected.

At the start of the winding of the spring on the skirt 62, the needle and tone arm are adjacent the wall 60 and the string 37 is positioned below the tone arm member 30. As the string is pulled it contacts the lower surface of the arm member 17$a$ and lifts it radially outwardly relative to the record to a position where its pointer 17$x$ finally, during the string pulling, makes contact with the cam 40. The lower end of the pin 17$b$ on the end of the tone arm acts to prevent the string from slipping off of the tone arm during the winding of the spring.

The foregoing described sound reproducing device provides a construction which is simple and effective, but yet is very rugged and durable and capable of withstanding very rough treatment. Particularly, it will withstand and properly respond to any manipulation that may be made by a child who does not understand the details of the mechanism but perceives only that by pulling the drawstring, the device will be caused to reproduce the sayings.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A sound reproducing apparatus in which is utilized a recorded message carrier having a plurality of separate discrete tracks in which are recorded a plurality of sayings to be reproduced, said sound reproducing apparatus including power means for moving said carrier, sound reproducing means engageable with any one of said tracks to reproduce the saying recorded therein and drawstring means for moving said sound reproducing means to the starting ends of said tracks and for energizing said power means to move said carrier, characterized by:

a cam loosely and rotatably mounted on said drawstring for randomly positioning said sound reproducing means, said cam having a longitudinal aperture through which said drawstring is slidably strung and an end generally inclined with respect to the longitudinal aperture thereof, said inclined end defining a plurality of axially spaced cam portions which randomly engage said sound reproducing means when said drawstring is pulled to cause said sound reproducing means to randomly engage one of said tracks, whereby said apparatus reproduces said sayings randomly;

a stop member adjacent said drawstring towards which said sound reproducing means is moved during said resetting by said drawstring, said sound reproducing means urging said cam into engagement with said stop member whereby said stop member arrests said cam and thereby positions said sound reproducing means.

2. In a sound reproducing apparatus of the type including a record having a plurality of sound grooves in which are recorded a plurality of sayings to be reproduced, a record support member for supporting said record thereon, a rewindable spring coupled to said support member for rotating said support member as said spring unwinds, a stylus-carrying tone arm having a stylus engageable in any one of said grooves to reproduce the saying therein recorded and a drawstring coupled to said spring, said drawstring being adapted to be pulled to wind said spring and to swing said tone arm from approximate center of said record to a position near the periphery of said record, the improvement comprising:

a stop member adjacent the outer periphery of said record in the path of travel of said tone arm and adjacent said drawstring; and a cam member loosely and slidably mounted on said drawstring between said stop member and said tone arm, said cam member having a longitudinal aperture through which said drawstring is loosely strung and an end generally inclined with respect to the longitudinal axis thereof, said inclined end defining a plurality of axially spaced cam portions which randomly engage said tone arm when said drawstring is pulled, said tone arm urging said cam member into engagement with said stop member.

References Cited

UNITED STATES PATENTS

| | | | |
|---|---|---|---|
| 3,410,564 | 11/1968 | Duncan et al. | 274—1 |
| 3,371,934 | 3/1968 | Duncan et al. | 274—1 |
| 3,370,855 | 2/1968 | Lindsay | 274—1 |
| 1,792,159 | 2/1931 | Gonzalez | 274—42 |

LEONARD FORMAN, Primary Examiner

D. A. DEARING, Assistant Examiner

U.S. Cl. X.R.

274—9